United States Patent
Reckhow et al.

(10) Patent No.: US 10,685,471 B2
(45) Date of Patent: Jun. 16, 2020

(54) METHODS AND SYSTEMS FOR PLAYING VIDEO WHILE TRANSITIONING FROM A CONTENT-ITEM PREVIEW TO THE CONTENT ITEM

(71) Applicant: Facebook, Inc., Menlo Park, CA (US)

(72) Inventors: Michael Waldman Reckhow, San Francisco, CA (US); Michael James Matas, Healdsburg, CA (US)

(73) Assignee: FACEBOOK, INC., Menlo Park, CA (US)

( * ) Notice: Subject to any disclaimer, the term of this patent is extended or adjusted under 35 U.S.C. 154(b) by 795 days.

(21) Appl. No.: 14/730,028

(22) Filed: Jun. 3, 2015

(65) Prior Publication Data

US 2016/0334973 A1 Nov. 17, 2016

Related U.S. Application Data

(60) Provisional application No. 62/159,887, filed on May 11, 2015.

(51) Int. Cl.
*G06F 3/0484* (2013.01)
*G06T 13/80* (2011.01)
(Continued)

(52) U.S. Cl.
CPC ........... *G06T 13/80* (2013.01); *H04N 21/431* (2013.01); *H04N 21/4312* (2013.01);
(Continued)

(58) Field of Classification Search
CPC ..... G06T 13/80; G06F 3/0488; G06F 3/0484; G06F 3/0416; G06F 16/739; G06F 16/745
See application file for complete search history.

(56) References Cited

U.S. PATENT DOCUMENTS 6,453,471 B1 * 9/2002 Klosterman ....... H04N 5/44543
348/563
6,545,687 B2 4/2003 Scott et al.
(Continued)

FOREIGN PATENT DOCUMENTS

KR 10-20140074888 A 6/2014
WO WO0179980 A1 10/2001

OTHER PUBLICATIONS

Facebook, Inc., International Search Report and Written Opinion, PCT/US2015/030204, dated Feb. 3, 2016, 11 pgs.
(Continued)

*Primary Examiner* — Sang H Kim
(74) *Attorney, Agent, or Firm* — Morgan, Lewis & Bockius LLP

(57) ABSTRACT

A content item includes content such as video. A preview of a content item that includes video is displayed by an electronic device, where displaying the preview includes playing the video. A user input selecting the content item is detected. In response to detecting the user input, the electronic device transitions from displaying the preview of the content item to displaying the content item, wherein displaying the content item includes displaying a portion of the content item not displayed in the preview. Furthermore, the electronic device continues to play the video while transitioning from displaying the preview of the content item to displaying the content item, and while displaying the content item.

17 Claims, 10 Drawing Sheets

(51) Int. Cl.
| | |
|---|---|
| *H04N 21/431* | (2011.01) |
| *H04N 21/4402* | (2011.01) |
| *H04N 21/472* | (2011.01) |
| *H04N 21/44* | (2011.01) |
| *H04N 21/458* | (2011.01) |

(52) U.S. Cl.
CPC ......... *H04N 21/44016* (2013.01); *H04N 21/440263* (2013.01); *H04N 21/458* (2013.01); *H04N 21/472* (2013.01)

(56) References Cited

U.S. PATENT DOCUMENTS

| | | | | |
|---|---|---|---|---|
| 6,668,377 | B1* | 12/2003 | Dunn | H04N 7/17318 348/E7.071 |
| 6,747,680 | B1 | 6/2004 | Igarashi et al. | |
| 7,952,596 | B2 | 5/2011 | Thörn | |
| 8,619,083 | B2 | 12/2013 | Nickolov et al. | |
| 8,707,185 | B2* | 4/2014 | Robinson | G06F 3/0481 705/319 |
| 9,003,305 | B2 | 4/2015 | Matas et al. | |
| 9,063,640 | B2 | 6/2015 | Hoffert et al. | |
| 9,165,340 | B2 | 10/2015 | Katakawa et al. | |
| 9,218,188 | B2 | 12/2015 | Matas et al. | |
| 9,229,632 | B2 | 1/2016 | Walkin et al. | |
| 9,235,321 | B2 | 1/2016 | Matas | |
| 9,240,064 | B2 | 1/2016 | Yaegashi et al. | |
| 9,245,312 | B2 | 1/2016 | Matas | |
| 9,423,941 | B2 | 8/2016 | Matas et al. | |
| 9,430,142 | B2 | 8/2016 | Amerige et al. | |
| 9,507,757 | B2 | 11/2016 | Matas et al. | |
| 9,557,876 | B2 | 1/2017 | Matas | |
| 10,042,532 | B2 | 8/2018 | Matas et al. | |
| 2002/0092029 | A1 | 7/2002 | Smith | |
| 2004/0025112 | A1 | 2/2004 | Chasen et al. | |
| 2005/0097458 | A1 | 5/2005 | Wilson | |
| 2005/0195157 | A1 | 9/2005 | Kramer et al. | |
| 2005/0210380 | A1 | 9/2005 | Kramer et al. | |
| 2006/0064716 | A1* | 3/2006 | Sull | G06F 17/30793 725/37 |
| 2006/0156254 | A1 | 7/2006 | Satake | |
| 2008/0168387 | A1* | 7/2008 | Brownrigg | G06F 3/0483 715/799 |
| 2009/0005032 | A1 | 1/2009 | Lunati et al. | |
| 2009/0066730 | A1 | 3/2009 | Mikawa | |
| 2009/0150784 | A1* | 6/2009 | Denney | G06F 17/3084 715/722 |
| 2009/0201313 | A1 | 8/2009 | Thorn | |
| 2010/0299641 | A1 | 11/2010 | Cundill | |
| 2011/0057880 | A1 | 3/2011 | Kasahara | |
| 2011/0126148 | A1* | 5/2011 | Krishnaraj | G06F 3/016 715/784 |
| 2011/0163971 | A1 | 7/2011 | Wagner et al. | |
| 2011/0238754 | A1* | 9/2011 | Dasilva | G06Q 50/01 709/204 |
| 2011/0271227 | A1 | 11/2011 | Takahashi | |
| 2012/0141095 | A1* | 6/2012 | Schwesinger | H04N 21/431 386/290 |
| 2012/0151383 | A1* | 6/2012 | Kazan | G06Q 10/101 715/753 |
| 2013/0038627 | A1 | 2/2013 | Mujkic et al. | |
| 2013/0106888 | A1 | 5/2013 | Penner et al. | |
| 2013/0110978 | A1* | 5/2013 | Gordon | G06Q 30/02 709/218 |
| 2013/0111395 | A1 | 5/2013 | Ying et al. | |
| 2013/0145267 | A1 | 6/2013 | Ramachandran | |
| 2013/0185753 | A1* | 7/2013 | Kliot | H04N 21/47217 725/39 |
| 2013/0198641 | A1 | 8/2013 | Brownlow et al. | |
| 2013/0198661 | A1 | 8/2013 | Matas | |
| 2013/0227494 | A1* | 8/2013 | Matas | G06T 11/60 715/849 |
| 2013/0326398 | A1 | 12/2013 | Zuverink et al. | |
| 2014/0002582 | A1 | 1/2014 | Bear et al. | |
| 2014/0047335 | A1* | 2/2014 | Lewis | G06F 3/0484 715/716 |
| 2014/0059457 | A1 | 2/2014 | Min | |
| 2014/0095328 | A1 | 4/2014 | Forouzandeh et al. | |
| 2014/0123021 | A1 | 5/2014 | Walkin et al. | |
| 2014/0129976 | A1 | 5/2014 | Beaurepaire et al. | |
| 2014/0132638 | A1 | 5/2014 | Matas | |
| 2014/0136946 | A1 | 5/2014 | Matas | |
| 2014/0137010 | A1 | 5/2014 | Matas et al. | |
| 2014/0149940 | A1 | 5/2014 | Li et al. | |
| 2014/0223292 | A1 | 8/2014 | Sakuta et al. | |
| 2014/0267441 | A1 | 9/2014 | Matas et al. | |
| 2014/0270684 | A1 | 9/2014 | Jayaram et al. | |
| 2014/0337147 | A1 | 11/2014 | DaSilva et al. | |
| 2015/0015789 | A1 | 1/2015 | Guntur et al. | |
| 2015/0062178 | A1 | 3/2015 | Matas et al. | |
| 2015/0121225 | A1 | 4/2015 | Somasundaram et al. | |
| 2015/0278986 | A1 | 10/2015 | Edwin et al. | |
| 2015/0309701 | A1 | 10/2015 | Jatzold et al. | |
| 2015/0346984 | A1* | 12/2015 | Flint | G06F 3/04847 715/720 |
| 2016/0041737 | A1 | 2/2016 | Castello et al. | |
| 2016/0054878 | A1 | 2/2016 | Matas | |
| 2016/0093023 | A1 | 3/2016 | Prasad et al. | |
| 2016/0328125 | A1 | 11/2016 | Matas et al. | |
| 2016/0328127 | A1 | 11/2016 | Reckhow et al. | |
| 2016/0334969 | A1 | 11/2016 | Reckhow et al. | |
| 2016/0334973 | A1 | 11/2016 | Reckhow et al. | |
| 2016/0360292 | A1* | 12/2016 | Lewis | H04N 21/435 |

OTHER PUBLICATIONS

Facebook, Inc., International Preliminary Report on Patentability, PCT/US2015/030204, dated Nov. 7, 2017, 7 pgs.
Facebook, Inc., Extended European Search Report, EP16150658.9, dated Feb. 23, 2016, 8 pgs.
Facebook, Inc., Communication Pursuant Rule 70a(1), EP16150658.9, dated Nov. 14, 2016, 2 pgs.
Facebook, Inc., Communication Pursuant Article 94(3), EP16150658.9, dated Jul. 3, 2017, 6 pgs.
Matas, Office Action, U.S. Appl. No. 14/704,472, dated Aug. 23, 2017, 40 pgs.
Reckhow, Office Action, U.S. Appl. No. 14/708,080, dated Aug. 28, 2017, 56 pgs.
Facebook, Inc., Registration Certificate, CA2,984,880, Dec. 6, 2017, 1 pg.
Matas, Notice of Allowance, U.S. Appl. No. 14/704,472, dated May 2, 2018, 14 pgs.
Reckhow, Office Action, U.S. Appl. No. 14/708,080, dated Oct. 17, 2018, 51 pgs.
Facebook, Inc., Notification of Reasons for Rejection, JP2017557469, dated Jan. 8, 2019, 6 pgs.
Matas, Office Action, U.S. Appl. No. 16/040,469, dated Oct. 31, 2019, 29 pgs.

* cited by examiner

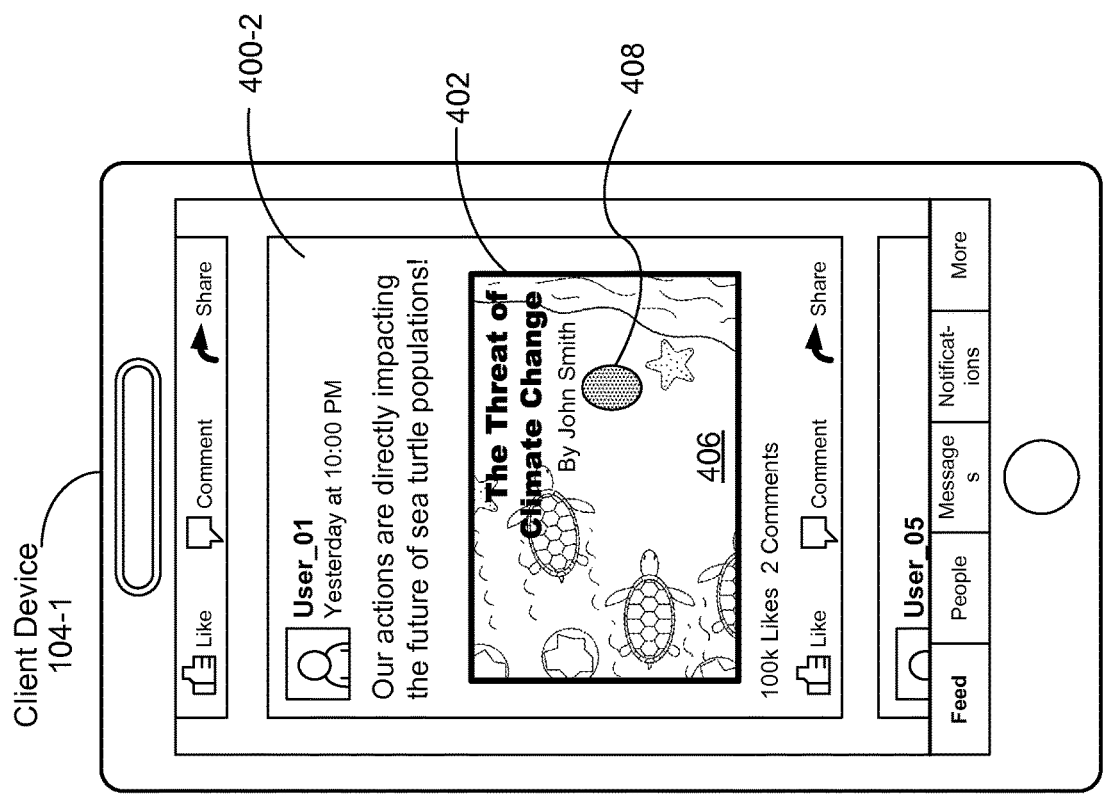
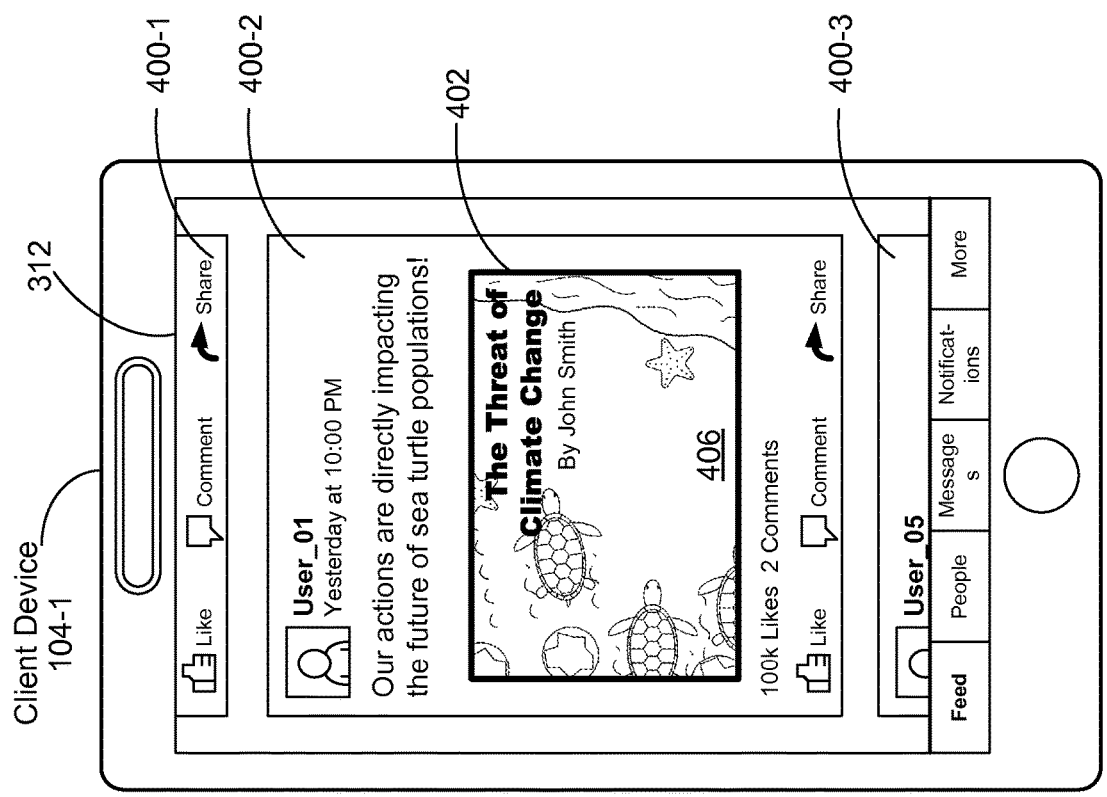
FIGURE 4A
FIGURE 4B

METHODS AND SYSTEMS FOR PLAYING VIDEO WHILE TRANSITIONING FROM A CONTENT-ITEM PREVIEW TO THE CONTENT ITEM

RELATED APPLICATIONS

This application claims priority to U.S. Provisional Patent Application Ser. No. 62/159,887, filed May 11, 2015, entitled "Methods And Systems For Playing Video While Transitioning From A Content-Item Preview To The Content Item," which application is incorporated by reference in its entirety.

TECHNICAL FIELD

This relates generally to viewing previews of content items, including but not limited to displaying playback of videos from a content item while transitioning from a preview to display of the content item.

BACKGROUND

The Internet has become an increasingly dominant platform for the publication of electronic content, for both the media and the general population. Electronic content takes on many forms, such as articles or web pages that include pictures, videos, or other visual content.

As the use of mobile devices for digesting electronic content becomes more prevalent, however, consumers often struggle to view and interact with electronic content in an engaging, efficient, and effective manner.

SUMMARY

Accordingly, there is a need for methods, systems, and interfaces for viewing previews of content items and transitioning from display of a preview to display of a content item itself. By displaying previews of content items (e.g., a news article), which includes displaying a portion of a content item and playing video embedded in the content item, and by continuing to play the video while transitioning to displaying the content item itself, users are given a more immersive and interactive viewing experience, and can efficiently and easily digest electronic content. Such methods and interfaces optionally complement or replace conventional methods for viewing previews of content items.

In accordance with some embodiments, a method is performed at an electronic device (e.g., a client device) with one or more processors and memory storing instructions for execution by the one or more processors. The method includes displaying a preview of a content item that includes video. Displaying the preview includes playing the video. A user input selecting the content item is detected. In response to detecting the user input, the method includes transitioning from displaying the preview of the content item to displaying the content item, wherein displaying the content item includes displaying a portion of the content item not displayed in the preview. Furthermore, the method includes continuing to play the video while transitioning from displaying the preview of the content item to displaying the content item, and while displaying the content item.

In accordance with some embodiments, an electronic device (e.g., a client device) includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above.

Thus, electronic devices are provided with more effective and efficient methods for viewing previews of content items, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 4A-4G illustrate exemplary graphical user interfaces (GUIs) on a client device for viewing content items and their previews, in accordance with some embodiments.

DESCRIPTION OF EMBODIMENTS

Figure 1:
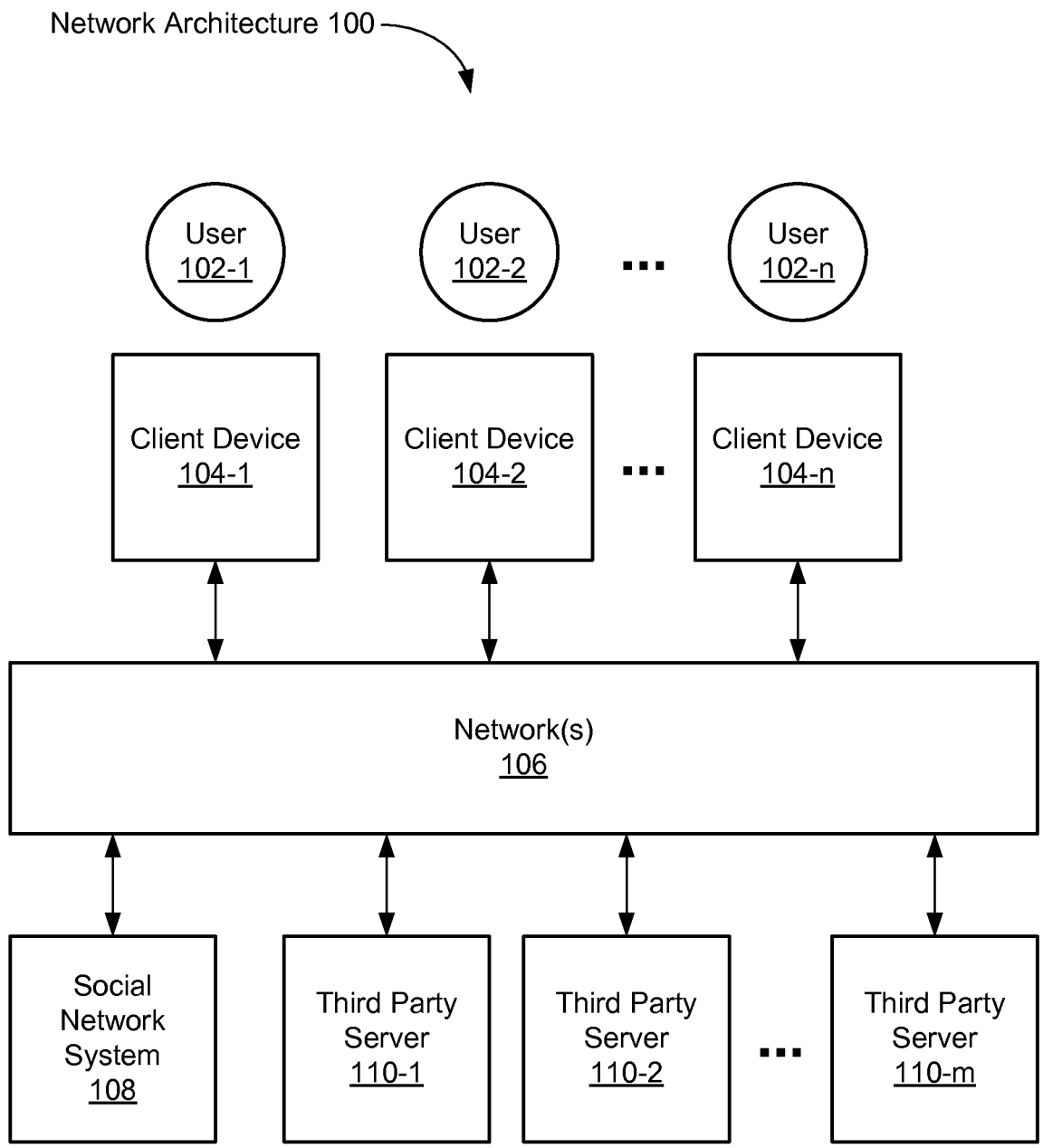
FIG. 1 is a block diagram illustrating an exemplary network architecture of a social network in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first portion of an item of content could be termed a second portion of the item of content, and, similarly, a second portion of the item of content could be termed a first portion of the item of content, without departing from the scope of the various described embodiments. The first portion of the item of content and the second portion of the item of content are both portions of the item of content, but they are not the same portion.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by posting information, such as text comments (e.g., updates, announcements, replies), digital photos, videos, audio files, links, and/or other electronic content (e.g., submitting user posts that include previews of content items, such as news articles). Users of the social-networking service can also annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content, such as content items (e.g., news articles, reviews, message feeds, etc.). Content items may include embedded content (e.g., text, photos, videos, audio, and/or other electronic content with which a user may interact, such as interactive maps, games, etc.).

In some embodiments, a given third-party server 110 is a single computing device, while in other embodiments, a given third-party server 110 is implemented by multiple computing devices working together to perform the actions of a server system (e.g., cloud computing).

Figure 2:
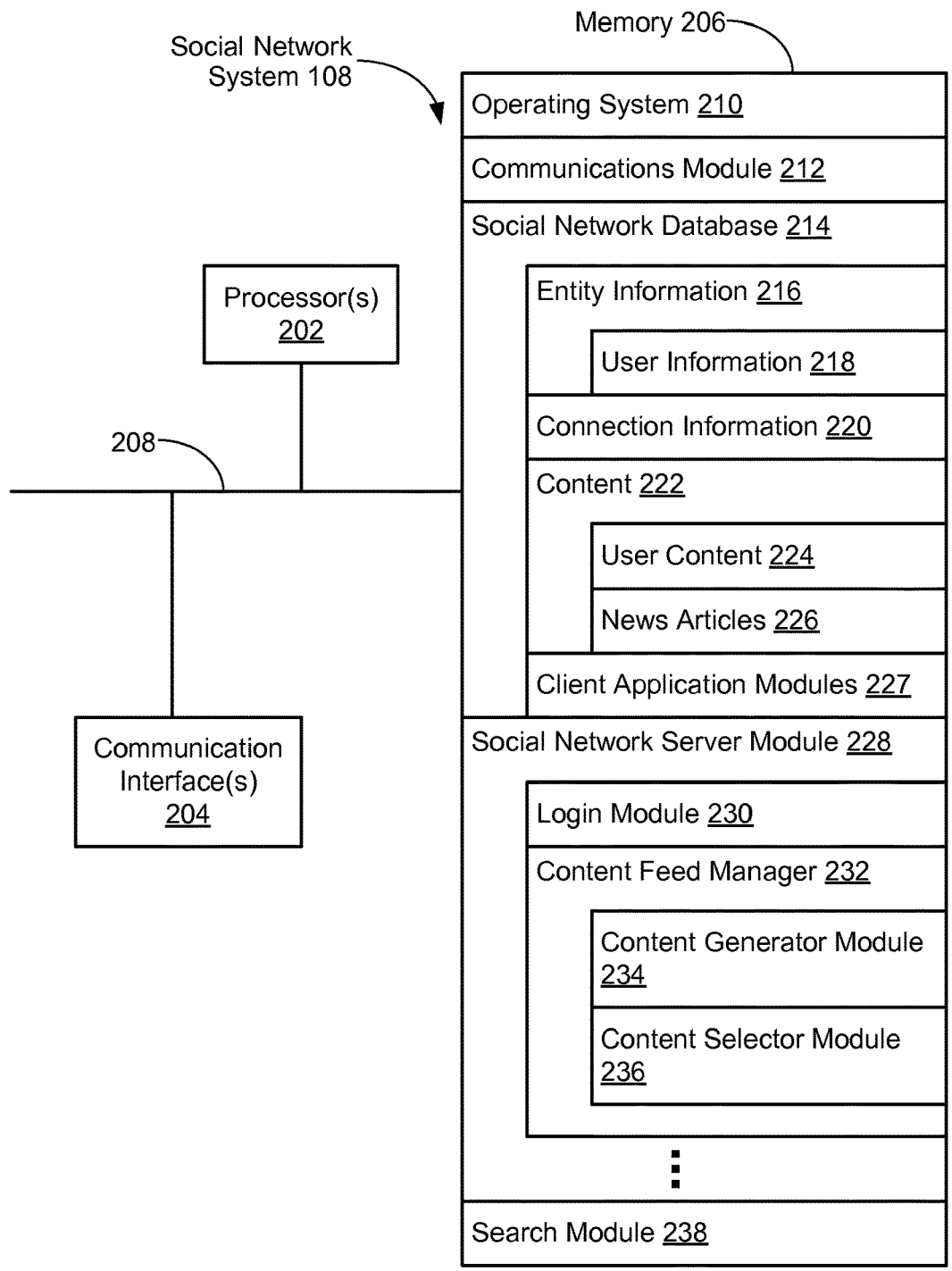
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
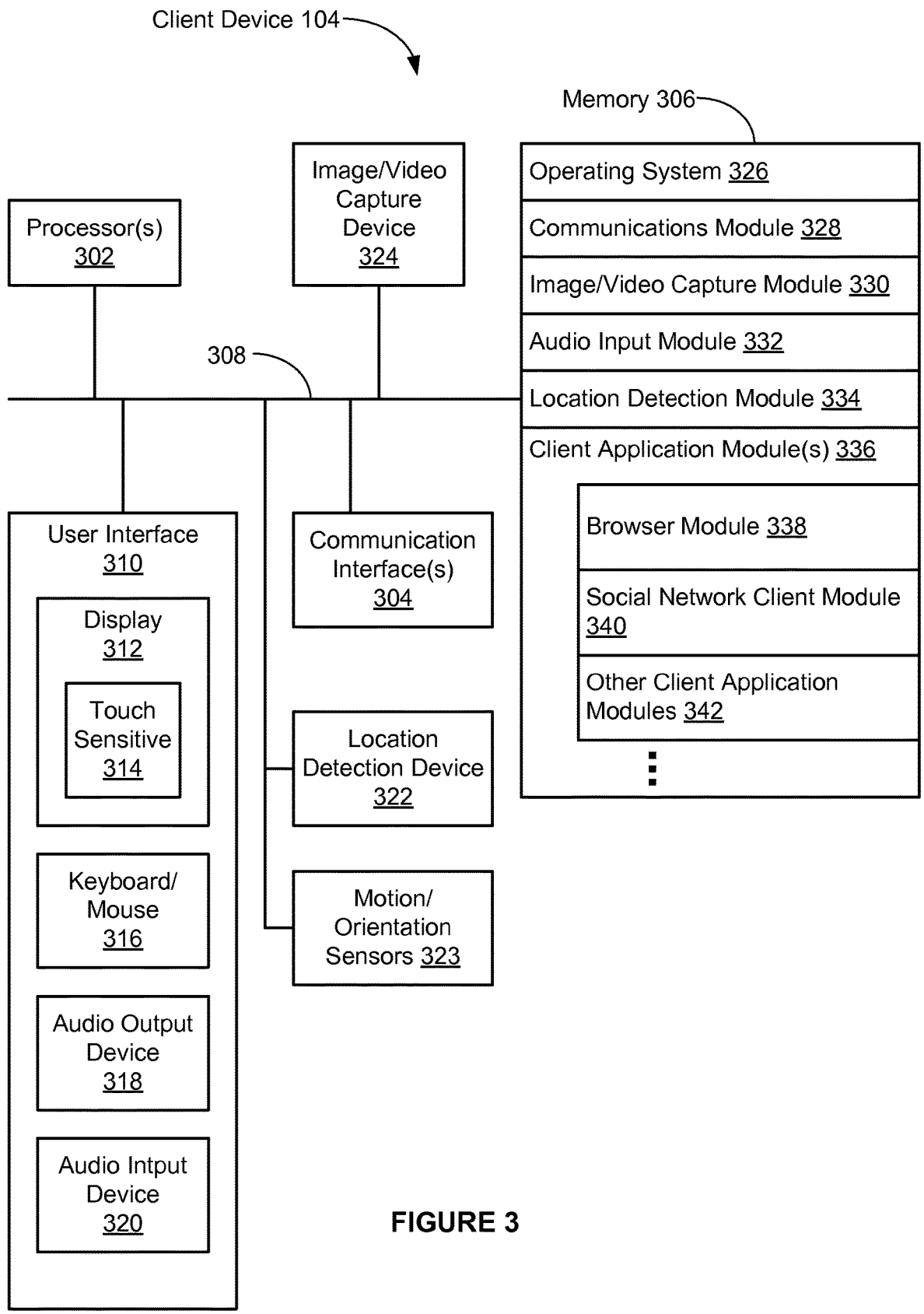
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106);
- a social network database 214 for storing data associated with the social network, such as:
  - entity information 216, such as user information 218; connection information 220; and
  - content 222, such as user content 224 (e.g., content items that include video, such as published articles, and previews of the content items, the previews displaying playback of videos from the content items) and/or news articles 226;
- a social network server module 228 for providing social-networking services and related features (e.g., in conjunction with browser module 338 or social network client module 340 on the client device 104, FIG. 3), which includes:
  - a login module 230 for logging a user 102 at a client 104 into the social-network system 108; and
  - a content feed manager 232 for providing content to be sent to clients 104 for display, which includes:
    - a content generator module 234 for adding objects to the social network database 214, such as images, videos, audio files, comments, status messages, links, applications, and/or other entity information 216, connection information 220, or content 222; and
    - a content selector module 236 for choosing the information/content to be sent to clients 104 for display; and
  - a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

In some embodiments, the client device 104 includes one or more optional sensors 323 (e.g., gyroscope, accelerometer) for detecting a motion and/or change in orientation of the client device. In some embodiments, a detected motion and/or orientation of the client device 104 (e.g., the motion/change in orientation corresponding to a user input produced by a user of the client device) is used to manipulate an interface (or content items within the interface) displayed on the client device 104.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:

a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108 and/or web sites that are linked to in a social network module 340 and/or an optional client application module 342), such as a web site hosting a service for displaying and accessing content items (e.g., news articles) with embedded content (e.g., text, photos, videos, audio, and/or other electronic content with which a user may interact), and previews of the content items (e.g., within user posts in a content feed);

a social network module 340 for providing an interface to a social-networking service (e.g., a social-networking service provided by social-network system 108) and related features, such as an interface to a service for displaying and accessing content items (e.g., news articles) with embedded content (e.g., text, photos, videos, audio, and/or other electronic content with which a user may interact), and previews of the content items (e.g., within user posts in a content feed); and/or optional client application modules 342, such as applications for displaying and accessing content items (e.g., news articles) with embedded content (e.g., text, photos, videos, audio, and/or other electronic content with which a user may interact), and previews of the content items (e.g., within user posts in a content feed), word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

FIGS. 4A-4G illustrate exemplary GUIs on a client device 104 for viewing content items and their previews, in accordance with some embodiments. The GUIs in these figures are displayed in response to detected user inputs, starting from the displayed feed item 400-2 (FIG. 4A), and are used to illustrate the processes described below, including the method 500 (FIGS. 5A-5C). The GUIs may be provided by a web browser (e.g., web browser module 338, FIG. 3), an application for a social-networking service (e.g., social network module 340), and/or a third-party application (e.g., client application module 342). While FIGS. 4A-4G illustrate examples of GUIs, in other embodiments, a GUI displays user-interface elements in arrangements distinct from the embodiments of FIGS. 4A-4G.

The examples provided in FIGS. 4A-4G illustrate sequential still frames of a video (e.g., video 406, FIG. 4F), where the video is continually playing while being displayed within a content-item preview and a content item itself, and while transitioning from the content-item preview to the content item. Continual playback is shown by the subjects within the video 402 changing positions at different times during playback of the video, each of the FIGS. 4A-4G representing a different time.

FIGS. 4A and 4B illustrate a GUI for displaying a content feed which includes a plurality of feed items 400-1 and 400-2 (e.g., posts by users of a social network, posts by third-party content providers, advertisements, etc.). Within a feed item 400-2, a content-item preview 402 for a content item is displayed. Content items include various types of formatted content (e.g., web content, such as HTML-formatted documents, or documents in proprietary web formats), including but not limited to news articles, web pages, blogs, user content published via a social-networking service, and/or other types of published content. Content items may include various types of content presentable to a user and with which a user may interact. Examples of content include text, digital media (e.g., photos, videos, audio), and/or other electronic content with which a user may interact (e.g., interactive maps, games, etc.). An example of a content item 404 is shown in FIG. 4F, which illustrates a news article (titled "The Threat of Climate Change") that includes a video 406 (playback of which shows sea turtles moving towards the water). The preview 402 is a preview of the content item 404.

A content-item preview (sometimes referred to as a "cover page") displayed within a feed item may include content from a corresponding content item (e.g., image or video of a content item). For example, the content-item preview 402 in FIG. 4A includes a video 406 from the content item 404 (shown in FIG. 4F). The content-item preview 402 may include additional information from the content item 404 (e.g., a title and byline, which in the example of FIG. 4A are superimposed on the video 406). Displaying the content-item preview 402 includes playing the video 406. For example, the content-item preview 402 in FIGS. 4A-4B displays the video 406 from the content item 404 (FIG. 4F) during playback, as represented by the changing positions of the turtles from FIG. 4A to 4B.

Figure 4D:
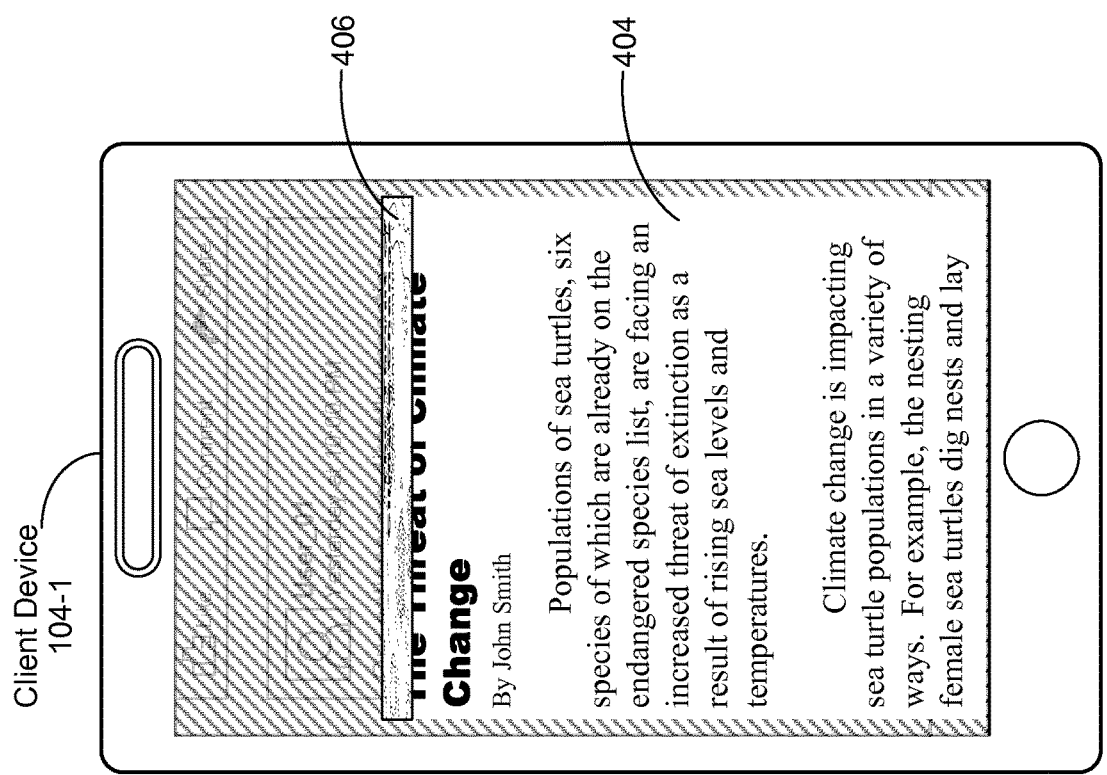
Figure 4C:
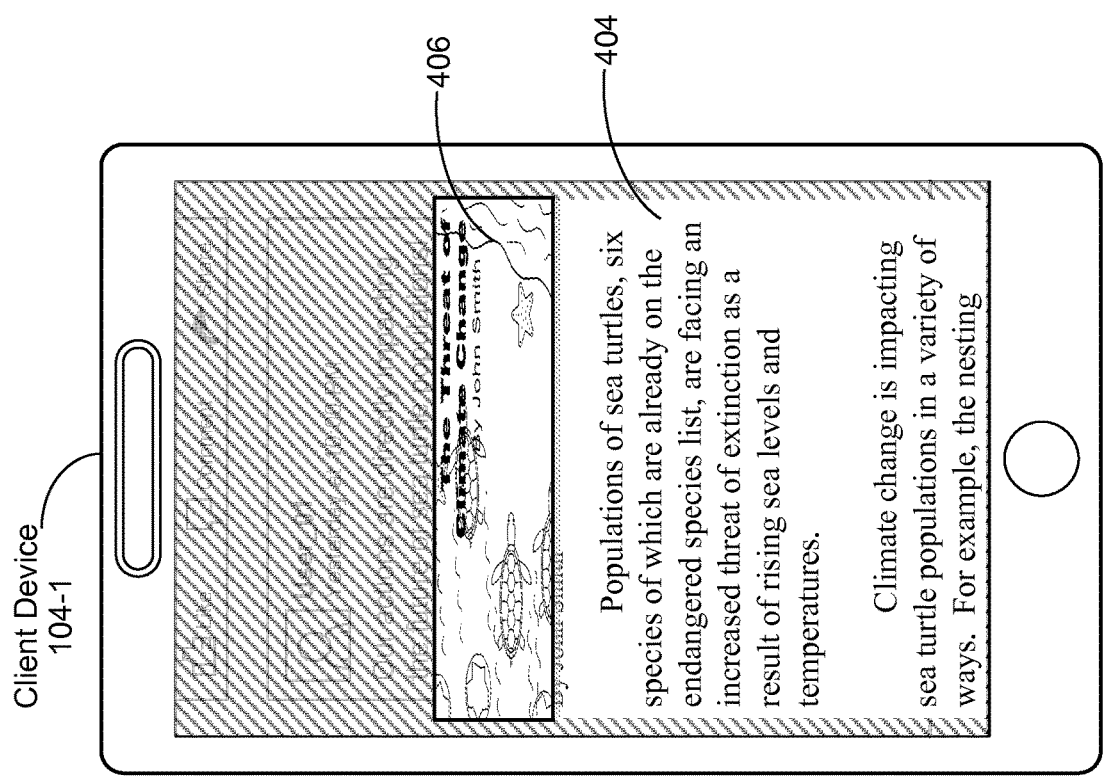
Figure 4F:
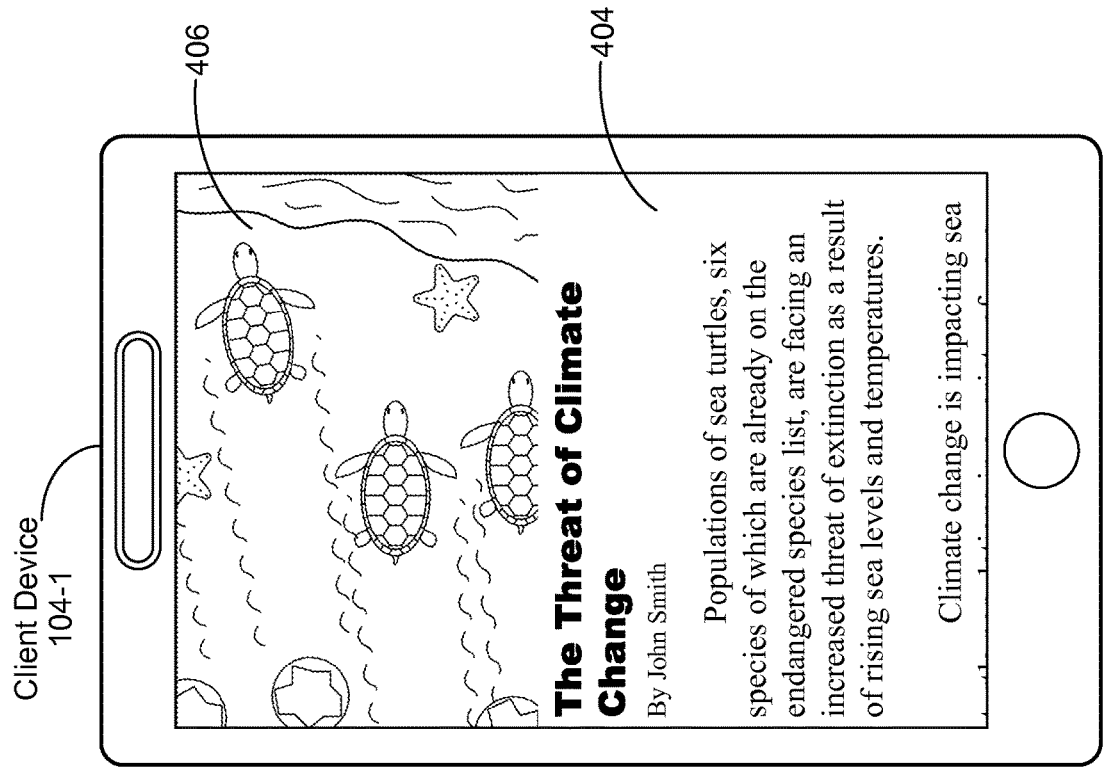
Figure 4E:
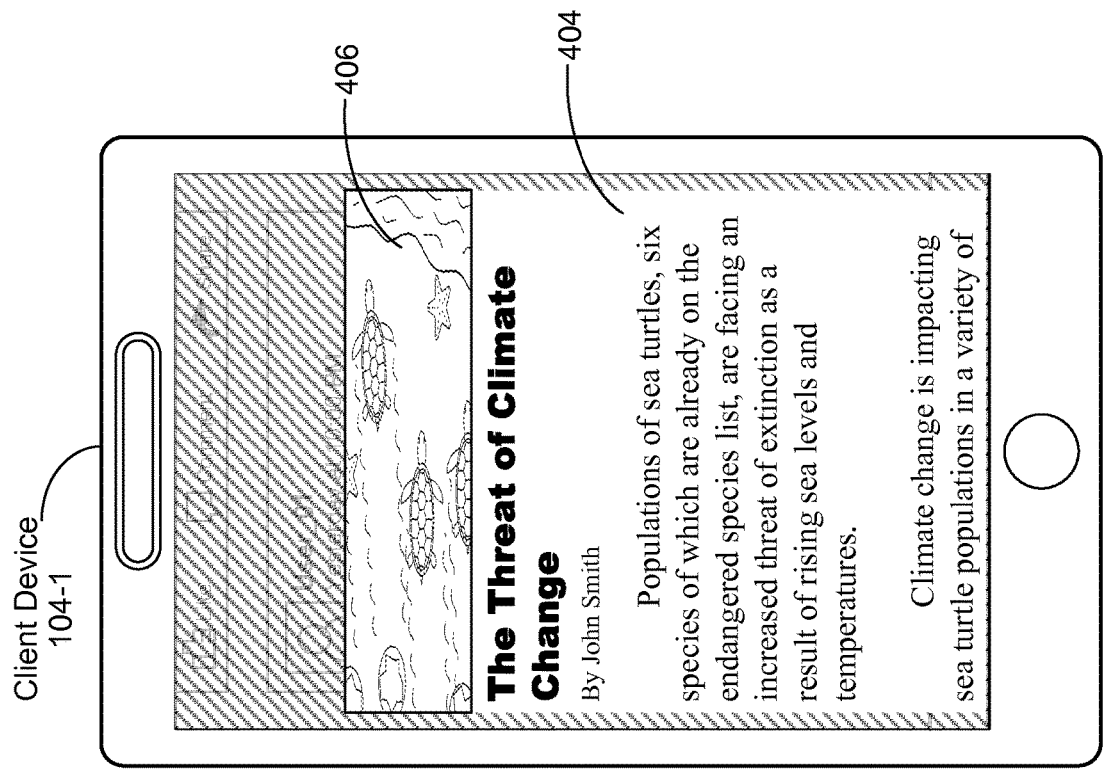
Figure 4G:
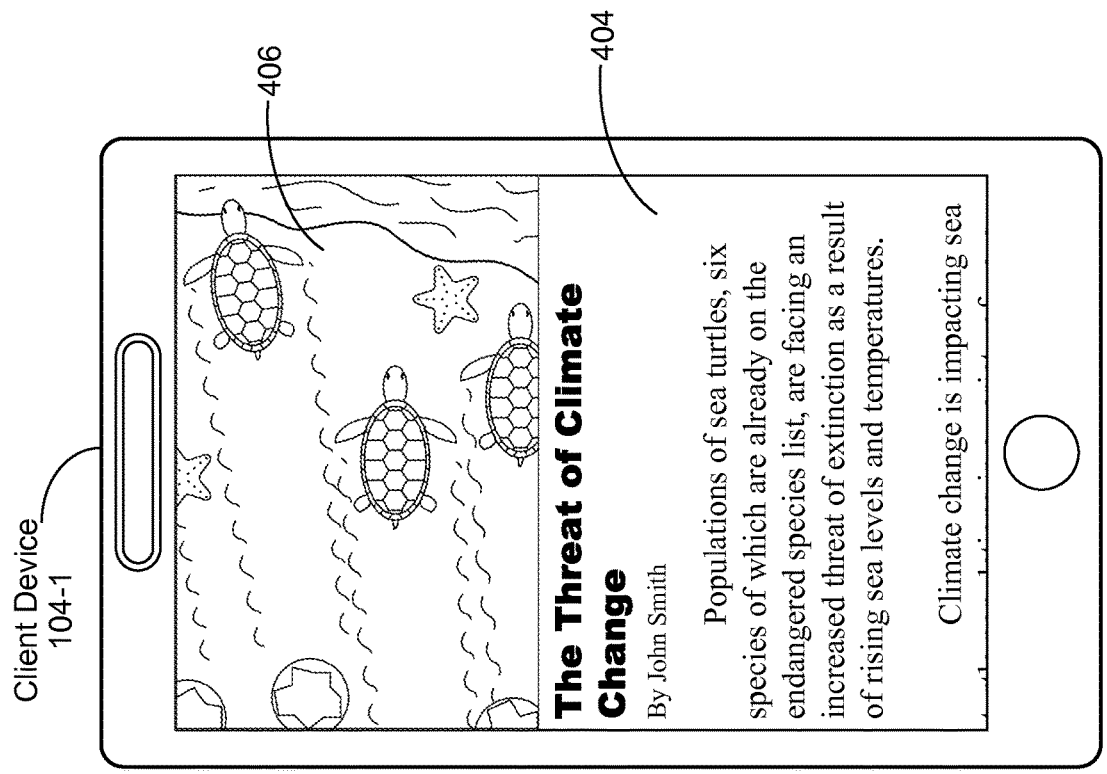
Figure 5A:
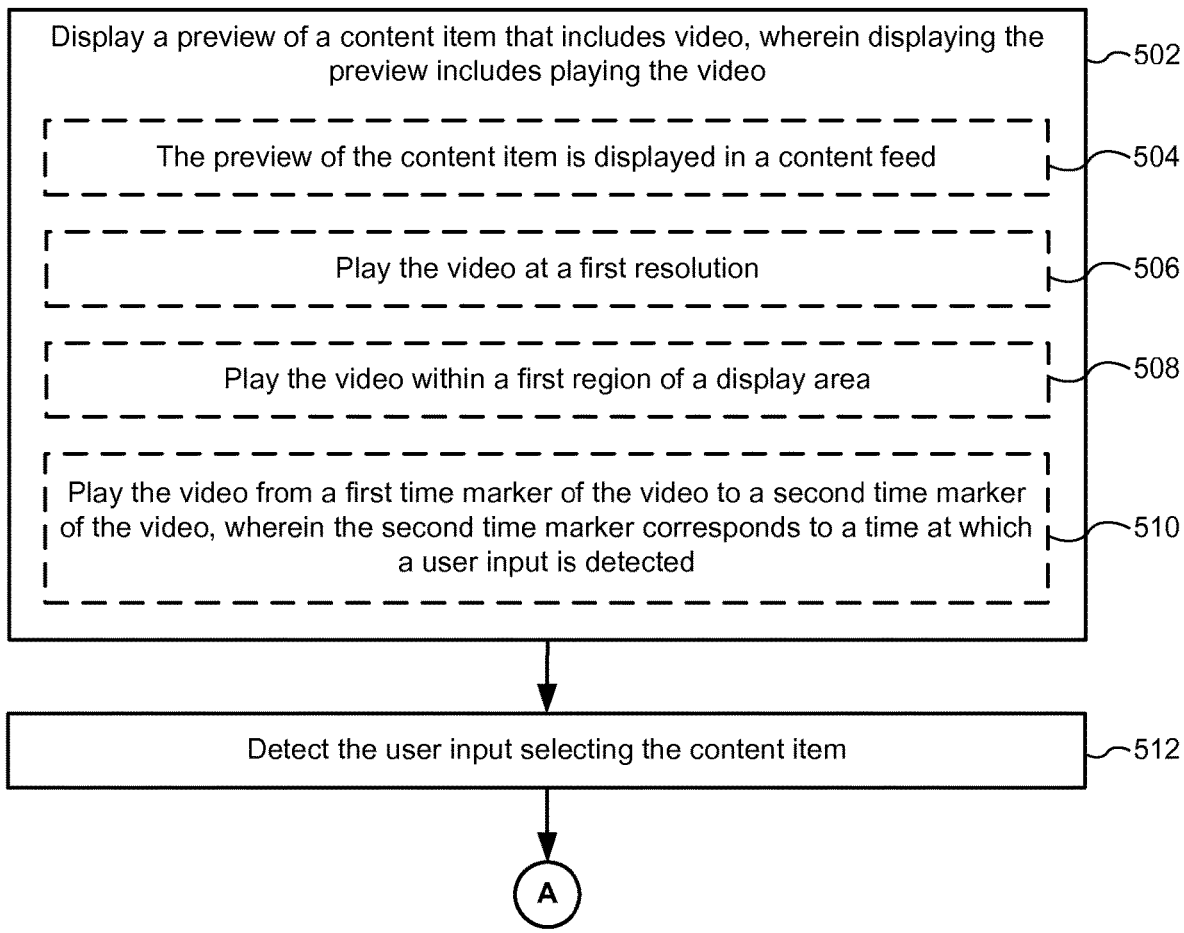
FIGS. 5A-5C are flow diagrams illustrating a method of viewing content items and their previews, in accordance with some embodiments.
Figure 5B:
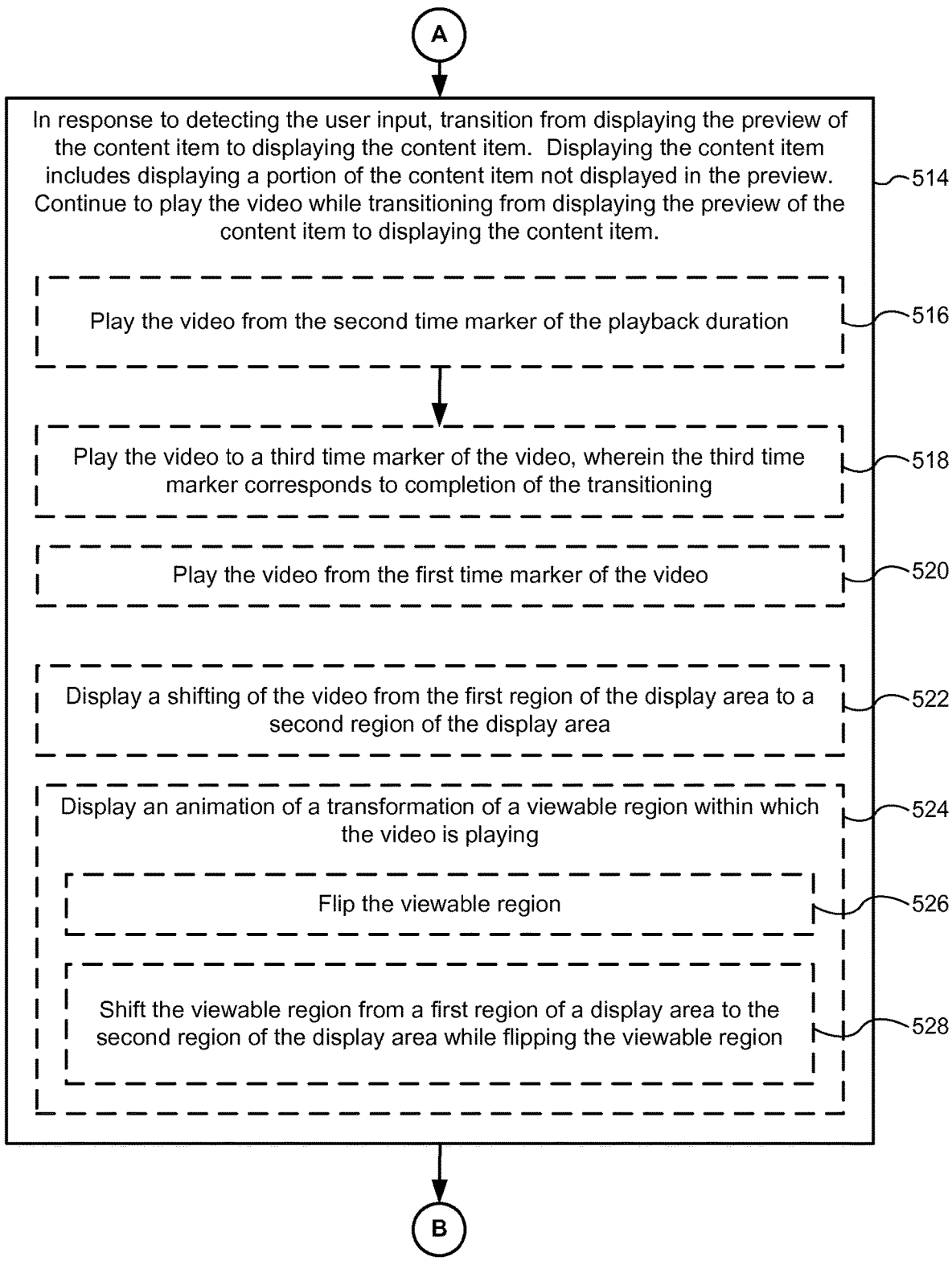
Figure 5C:
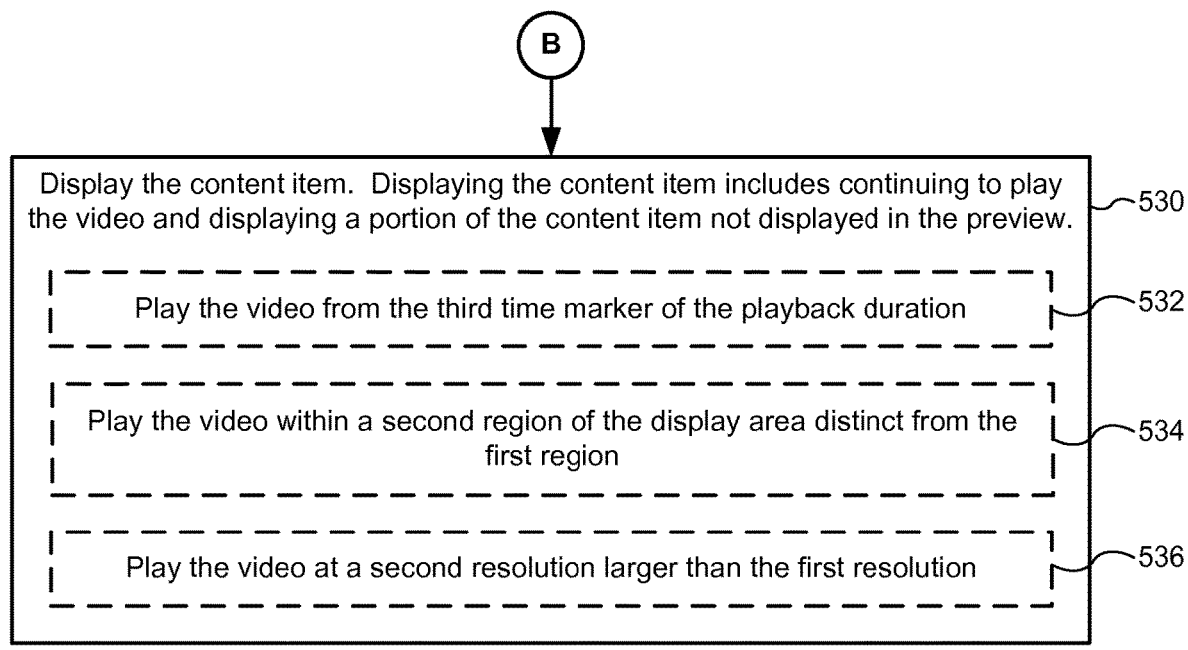

In FIG. 4B, a gesture 408 (e.g., a tap) is detected on the content-item preview 402. In response to detecting the gesture 408 on the content-item preview 402, the client device transitions from displaying the content-item preview 402 to displaying the content item 404. An animation of the transition is shown in FIGS. 4C-4F. In this example, the animation is a flip of the video (e.g., of a viewable region within which the video is displayed), but without changing the orientation of the video. Throughout and after the transition, the video 406 continues to play (as represented by the changing positions of the turtles). In some embodiments, in comparison to the content-item preview 402 (FIG. 4B), the position of the video 406 is shifted and/or the resolution of the video 406 is enlarged when the content item 404 is displayed (FIGS. 4F-4G).

The GUIs shown in FIGS. 4A-4G are described in greater detail below in conjunction with the method 500 of FIGS. 5A-5C.

FIGS. 5A-5C are flow diagrams illustrating the method 500 of viewing content items and their previews, in accordance with some embodiments. The method 500 is performed on an electronic device (e.g., client device 104, FIGS. 1 and 3). FIGS. 5A-5C correspond to instructions stored in a computer memory (e.g., memory 306 of the client device 104, FIG. 3) or other computer-readable storage medium. To assist with describing the method 500, FIGS. 5A-5C will be described with reference to the exemplary GUIs illustrated in FIGS. 4A-4G.

In the method 500, the electronic device displays (502) a preview of a content item that includes video. Displaying the preview includes playing the video. As described above, content items include various types of formatted content (e.g., web content, such as HTML-formatted documents, or documents in proprietary web formats), including but not limited to news articles, web pages, blogs, user content published via a social-networking service, and/or other types of published content. An example is shown in FIGS. 4A-4B. In this example, a content-item preview 402 is a preview of the content item 404 (shown in FIGS. 4C-4G), and is displayed within a feed item 400-2 (e.g., a user post submitted on a social-networking service). The content-item preview 402 includes a video from the corresponding content item 404 (e.g., video 406, FIGS. 4C-4G) that has started playback (as illustrated by the subjects within the video 406 changing positions in FIGS. 4A and 4B). For example, playback of the video 406 starts when display of the content-item preview 402 starts.

In some embodiments, the preview of the content item is displayed (504) in a content feed (e.g., content feed in FIG. 4A). A preview of a content item may also be displayed within a different content item (e.g., as a link to/preview of a different content item).

In some embodiments, the video is played (506) at a first resolution. In some embodiments, the first resolution is a resolution at which the entire width of the video is contained within the display area (e.g., content-item preview 402 includes a video 406 that is playing at a resolution at which the entire video is viewable and contained within the display area). In some embodiments, the display area has a display height and a display width, wherein the width of the video being played at the first resolution is contained within the display width of the display area (e.g., equals the screen width, window width, or tile width). In some embodiments, the width of the video being displayed at the first resolution is less than the display width (e.g., video 406 of the content-item preview 402, as shown in FIG. 4B).

In some embodiments, the video is played (508) within a first region of a display area. In the example shown in FIGS. 4A-4B, the content-item preview 402 includes a video 406 that is playing in a region that is approximately at the center of the display area (e.g., defined by the viewable region of the touch-sensitive display 312). The video 406 of the content-item preview 402 may, however, be played within other regions of the display area if a user input (e.g., drag/swipe gesture) is detected in which a user is scrolling through the GUI to view the other displayed feed items 400.

In some embodiments, the video is played (510) from a first time marker of the video to a second time marker of the video while the preview is being displayed, wherein the second time marker corresponds to a time at which a user input is detected (at 512). Time markers correspond to various points of reference with respect to the playback length of a video (e.g., 3-second mark of a 10-second long video clip). In the example shown in FIGS. 4A-4B, the video 406 of the content-item preview 402 is played from a first time marker (e.g., corresponding to the beginning of playback) to a second time marker corresponding to the time at which the gesture 408 (e.g., a tap) is detected.

In some embodiments, time markers define one or more segments of a corresponding video. A video 406, for example, may be a video having a playback duration or length (e.g., 20-second video), and may include any number of sequential video segments having respective durations, where the video segments composing a video correspond to various time markers (e.g., start/end time markers) with respect to the playback length of a video. As an example, a video having a 20-second playback duration may include a first video segment having a 10-second duration, a second video segment having a 5-second duration, and a third video segment having a 5-second duration. In this example, the first video segment corresponds to a portion of the video that begins at a 0-second first time marker and ends at a 10-second second time marker, the second video segment corresponds to a portion of the video that begins at the 10-second time marker and ends at a 15-second third time marker, and the third video segment corresponds to a portion of the video that begins at the 15-second third time marker and ends at a 20-second final time marker. In some embodiments, video segments of a video are not predefined, and are determined in accordance with respective times at which user inputs are detected during playback of the video. For example, a first video segment corresponds to a portion of the video defined by the beginning of playback and an ending time marker determined by the time at which a user input (e.g., selection of the video) is detected.

A user input selecting the content item is detected (512). In some embodiments, the user input is a touch gesture (e.g., tap) detected on the preview of the content item (e.g., gesture 408 detected on the content-item preview 402, FIG. 4B).

Referring now to FIG. 4B, in response to detecting (512) the user input, the electronic device transitions (514) from displaying the preview of the content item to displaying the content item. Displaying the content item includes displaying a portion of the content item not displayed in the preview. The video continues to play while transitioning from displaying the preview of the content item to displaying the content item. An example is shown in FIGS. 4B-4G, where the transition begins in response to detecting the gesture 408 in FIG. 4B and is shown throughout FIGS. 4C-4E. The completion of the transition is shown in FIG. 4F, the point at which the content item is displayed and the preview of the content item is no longer displayed.

In some embodiments, the portion of the content item not displayed (512) in the preview is a first portion (e.g., text in the body of the content item 404, FIG. 4C), and displaying (502) the preview includes displaying a second portion of the content item distinct from the video and distinct from the first portion (e.g., the title and author shown in the content-item preview 402, FIG. 4B). In some embodiments, displaying (512) the content item further comprises displaying the second portion (e.g., the content-item preview 402 in FIG. 4B and the content item 404 in FIG. 4C both display the title and author).

In some embodiments, continuing to play (514) the video while transitioning from displaying the preview of the content item to displaying the content item includes (516) playing the video from the second time marker of the playback duration. Referring to the example of FIG. 4B, the second time marker corresponds to the point in time at which the user input (e.g., gesture 408) is detected. Beginning with FIG. 4C, continuing to play the video 406 therefore includes playing the video from the point in time shown in FIG. 4B (i.e., the second time marker). In some embodiments, continuing to play (514) the video while transitioning includes (518) playing the video to a third time marker of the video, wherein the third time marker corresponds to completion of the transitioning. Referring to the previous example, the client device 104-1 continues playing from the second time marker corresponding to the point in time at which the user input (e.g., gesture 408) is detected, to a third time marker corresponding to the completion of the transition, as shown in FIG. 4F. An indication that the transition is completed may include the content item being fully loaded/downloaded, the resolution of the video 406 no longer increasing, the content feed/feed items no longer being displayed, and/or the completion of any animations initiated during the transition (e.g., content item 404 fully unfolds and/or flipping of the video 406 finishes).

In some embodiments, continuing to play (514) the video while transitioning includes (520) playing the video from the first time marker of the video. For example, if the first time marker corresponds to the beginning of playback for the video 406, continuing to play the video in response to detecting the user input and while transitioning includes restarting playback of the video in response to detecting the user input.

In some embodiments, transitioning (514) from displaying the preview of the content item to displaying the content item includes (522) displaying a shifting of the video from the first region of the display area to a second region of the display area. For example, FIGS. 4B-4F illustrate a transition in which the video 406 played in the content-item preview 402 shifts from a first region that is located approximately at the center of the display area (FIG. 4B), to a second region that is located approximately at an upper portion of the display area (FIG. 4F) (i.e., a substantially upwards shift). In some embodiments, during the transition, the video is shifted substantially downwards (i.e., from a higher region to a lower region) or sideways (e.g., from left to right, or right to left).

In some embodiments, transitioning (514) from displaying the preview of the content item to displaying the content item includes (524) displaying an animation of a transformation of a viewable region within which the video is playing. In some embodiments, displaying (524) the animation includes (526) flipping the viewable region. In some embodiments, flipping the viewable region includes rotating the viewable region about a horizontal axis while leaving a vertical orientation of the video unchanged. In some embodiments, the horizontal axis bisects the viewable region. An example is shown in FIGS. 4C-4F. Other examples of animations include an animation in which the content item expands and increases in resolution (e.g., until the content item fills the display area), an animation in which the content item slides into view (e.g., from off the screen), or an animation in which the content item fades into view. In some embodiments, displaying (524) the animation further includes (528) shifting the viewable region from a first region of a display area to a second region of the display area while flipping the viewable region (e.g., as shown in FIGS. 4C-4F, which illustrate both a flipping and shifting of the viewable region that includes the video 406).

Referring now to FIG. 5C, the electronic device displays (530) the content item. Displaying the content item includes continuing to play the video and displaying a portion of the content item not displayed in the preview (e.g., text from the body of the content item 400). In some embodiments, continuing (530) to play the video includes playing (532) the video from the third time marker of the playback duration (e.g., continuing from operation 518 in FIG. 5B, where the third time marker corresponds to completion of the transitioning in 514). An example is shown in FIGS. 4F-4G. FIG. 4F illustrates the video 406 at a point in playback (e.g., a third time marker) when the transitioning has completed and the content item 404 is displayed. FIG. 4G illustrates the video 406 at a point in playback after the third time marker as the video 406 continues playback. Thus, the video 406 continues playing without interruption of playback, starting from the point in time at which the content-item preview 402 is displayed (FIG. 4A-4B), throughout the transition from displaying the preview to displaying the content item (FIG. 4C-4E), and while the content item is displayed (FIGS. 4F-4G), in accordance with some embodiments.

In some embodiments, continuing (530) to play the video while displaying the content item after the transitioning includes (534) playing the video within a second region of the display area distinct from the first region (e.g., the video 406 in the content-item preview 402 playing within one region in FIG. 4B, and the video 406 playing within a different region in FIG. 4F). For example, the viewable region within which the video 406 is displayed shifts from a first region of the display area to a second region of the display area. In some embodiments, continuing to play the video while displaying the content item after the transitioning includes playing the video within the first region of the display area.

In some embodiments, continuing (530) to play the video while displaying the content item after the transitioning includes (536) playing the video at a second resolution larger than the first resolution (e.g., the video 406 in FIG. 4F is displayed at a larger resolution than the video displayed within the content-item preview 402 in FIG. 4B). In some embodiments, the transitioning (514) includes increasing the resolution of the video from the first resolution to the second resolution. In some embodiments, while displaying the content item, the video is played at the same resolution as the video played in the preview.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at an electronic device having one or more processors and memory storing instructions for execution by the one or more processors:
displaying a content feed of a social media network, wherein the content feed includes a plurality of social media posts;
displaying a preview of a content item in a respective social media post of the plurality of social media posts of the content feed, the preview including video and a first textual portion of the content item, wherein displaying the preview comprises playing the video;
detecting a user input selecting the content item;
in response to detecting the user input, transitioning from displaying the preview of the content item, including the video and the first textual portion of the content item, to displaying the content item, wherein displaying the content item comprises displaying a second textual portion of the content item not displayed in the preview; and
continuing to play the video while transitioning from displaying the preview of the content item to displaying the second textual portion of the content item, and while displaying the second textual portion of the content item;
wherein transitioning from displaying the preview of the content item to displaying the content item comprises rotating a viewable region within which the video is playing, the rotation about a horizontal axis while leaving a vertical orientation of the video unchanged.

2. The method of claim 1, wherein:
displaying the preview comprises playing the video from a first time marker of the video to a second time marker of the video, wherein the second time marker corresponds to a time at which the user input is detected; and
continuing to play the video while transitioning from displaying the preview of the content item to displaying the content item comprises playing the video for a duration of time from the second time marker of the video.

3. The method of claim 2, wherein:
continuing to play the video while transitioning from displaying the preview of the content item to displaying the content item further comprises playing the video to a third time marker of the video, wherein the third time marker corresponds to completion of the transitioning; and
continuing to play the video while displaying the content item comprises playing the video from the third time marker of the video to an end time marker of the video.

4. The method of claim 1, wherein:
displaying the preview comprises playing the video from a first time marker of the video to a second time marker of the video, wherein the second time marker corresponds to a time at which the user input is detected; and
continuing to play the video while transitioning from displaying the preview of the content item to displaying the content item comprises playing the video from the first time marker of the video.

5. The method of claim 1, wherein displaying the second textual portion of the content item further comprises displaying the first textual portion.

6. The method of claim 1, wherein:
displaying the preview comprises playing the video within a first region of a display area; and
continuing to play the video while displaying the content item after the transitioning comprises playing the video within a second region of the display area distinct from the first region.

7. The method of claim 6, wherein transitioning from displaying the preview of the content item to displaying the content item comprises displaying a shifting of the video from the first region of the display area to the second region of the display area.

8. The method of claim 1, wherein transitioning from displaying the preview of the content item to displaying the content item comprises displaying an animation of a transformation of the viewable region within which the video is playing.

9. The method of claim 8, wherein displaying the animation further comprises shifting the viewable region from a first region of a display area to a second region of the display area while flipping the viewable region.

10. The method of claim 1, wherein flipping the viewable region comprises rotating the viewable region about a horizontal axis while leaving a vertical orientation of the video unchanged.

11. The method of claim 10, wherein the horizontal axis bisects the viewable region.

12. The method of claim 1, wherein:
displaying the preview comprises playing the video at a first resolution; and
continuing to play the video while displaying the content item after the transitioning comprises playing the video at a second resolution larger than the first resolution.

13. An electronic device, comprising:
one or more processors; and
memory storing one or more programs for execution by the one or more processors, the one or more programs including instructions for:
displaying a content feed of a social media network, wherein the content feed includes a plurality of social media posts;
displaying a preview of a content item in a respective social media post of the plurality of social media posts of the content feed, the preview including video and a first textual portion of the content item, wherein displaying the preview comprises playing the video;
in response to detecting a user input selecting the content item, transitioning from displaying the preview of the content item, including the video and the first textual portion of the content item, to displaying the content item, wherein displaying the content item comprises displaying a second textual portion of the content item not displayed in the preview; and
continuing to play the video while transitioning from displaying the preview of the content item to displaying the second textual portion of the content item, and while displaying the second textual portion of the content,
wherein transitioning from displaying the preview of the content item to displaying the content item comprises rotating a viewable region within which the video is playing, the rotation about a horizontal axis while leaving a vertical orientation of the video unchanged.

14. The electronic device of claim 13, wherein:
displaying the preview comprises playing the video from a first time marker of the video to a second time marker of the video, wherein the second time marker corresponds to a time at which the user input is detected; and
continuing to play the video while transitioning from displaying the preview of the content item to displaying the content item comprises playing the video for a duration of time from the second time marker of the video.

15. A non-transitory computer-readable storage medium storing one or more programs for execution by one or more processors of an electronic device, the one or more programs including instructions for:
displaying a content feed of a social media network, wherein the content feed includes a plurality of social media posts;
displaying a preview of a content item in a respective social media post of the plurality of social media posts of the content feed, the preview including video and a first textual portion of the content item, wherein displaying the preview comprises playing the video;
detecting a user input selecting the content item;
in response to detecting the user input, transitioning from displaying the preview of the content item, including the video and the first textual portion of the content item, to displaying the content item, wherein displaying the content item comprises displaying a second textual portion of the content item not displayed in the preview; and
continuing to play the video while transitioning from displaying the preview of the content item to displaying the second textual portion of the content item, and while displaying the second textual portion of the content item,
wherein transitioning from displaying the preview of the content item to displaying the content item comprises rotating a viewable region within which the video is playing, the rotation about a horizontal axis while leaving a vertical orientation of the video unchanged.

16. The non-transitory computer-readable storage medium of claim 15, wherein:
displaying the preview comprises playing the video from a first time marker of the video to a second time marker of the video, wherein the second time marker corresponds to a time at which the user input is detected; and
continuing to play the video while transitioning from displaying the preview of the content item to displaying the content item comprises playing the video for a duration of time from the second time marker of the video.

17. The non-transitory computer-readable storage medium of claim 15, wherein:
continuing to play the video while transitioning from displaying the preview of the content item to displaying the content item further comprises playing the video to a third time marker of the video, wherein the third time marker corresponds to completion of the transitioning; and
continuing to play the video while displaying the content item comprises playing the video from the third time marker of the video to an end time marker of the video.

* * * * *